May 1, 1923.
J. T. BELL
TRACTOR-APPLIANCE FOR TRUCKS
Filed June 18, 1921
1,453,782
*Fig. 1.*
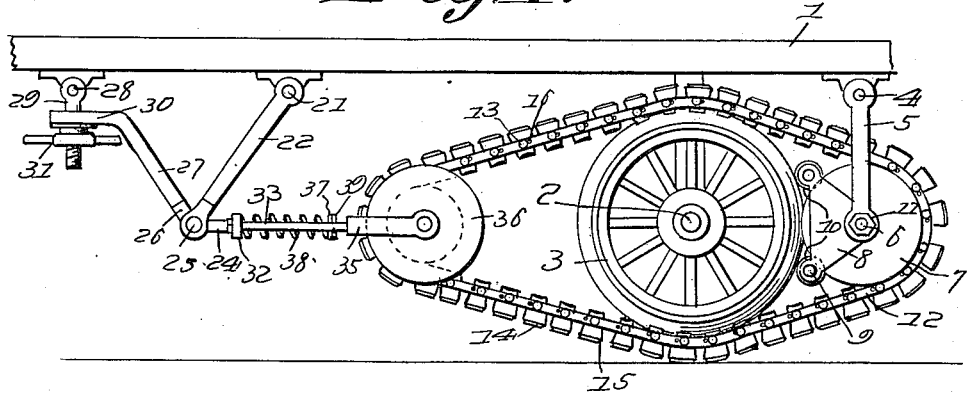
*Fig. 2.*
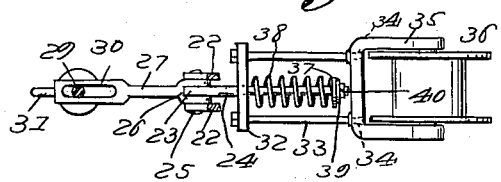
*Fig. 3.*
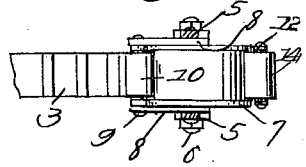
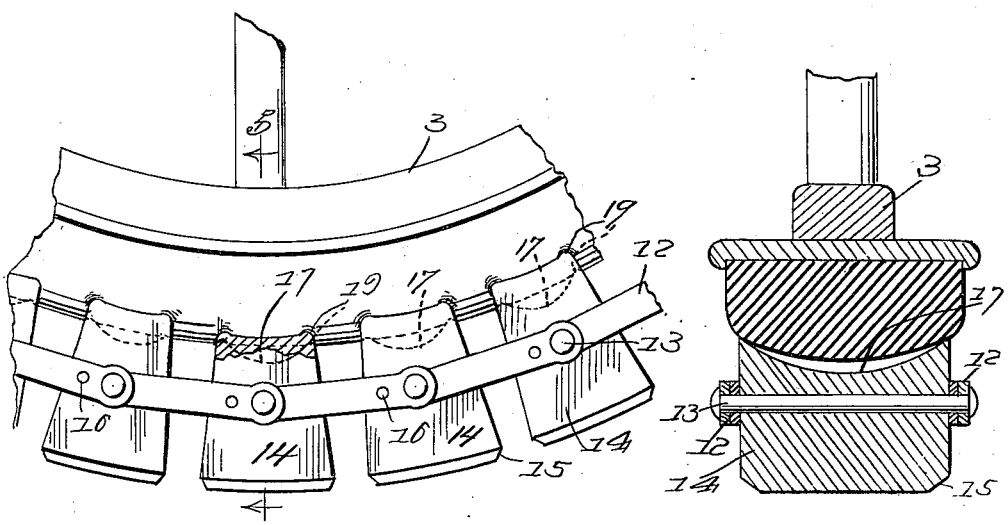
*Fig. 4.*
*Fig. 5.*
Inventor
John Thomas Bell,
By Watson E. Coleman
Attorney Patented May 1, 1923.

1,453,782

UNITED STATES PATENT OFFICE.

JOHN THOMAS BELL, OF REDFORD, MICHIGAN.

TRACTOR APPLIANCE FOR TRUCKS.

Application filed June 18, 1921. Serial No. 478,554.

*To all whom it may concern:*

Be it known that I, JOHN THOMAS BELL, a citizen of the United States, residing at Redford, in the county of Wayne and State of Michigan, have invented certain new and useful Improvements in Tractor Appliances for Trucks, of which the following is a specification, reference being had to the accompanying drawings.

This invention relates to tractor appliances whereby to secure a greater tractive engagement between the ground and a truck or automobile wheel, and particularly to that class of tractor appliances which includes an endless tractor chain passing over and tractively engaged with the truck wheels and operatively supported upon the vehicle.

One of the objects of the present invention is to provide a tractor appliance of this character wherein the endless tractor chain passes above and below the driving wheel and has tractive engagement therewith, the forward bight of the chain being supported by a resiliently retracted wheel whereby the chain is kept taut at all times and the rear bight of the chain is supported by means of a swingingly mounted wheel, the supports of which carry thrust rollers engaging the periphery of the drive wheel so that when the machine backs the strain on this pulley will be supported by the drive wheel itself.

Other objects will appear in the course of the following description.

While the design and construction at present illustrated and set forth is deemed preferable, it is obvious that as a result of a reduction of the invention to a more practical form for commercial purposes, the invention may be susceptible of changes, and the right to these changes is claimed, provided they are comprehended within the scope of what is claimed.

The invention comprises further features and combination of parts, as will be hereinafter set forth, shown in the drawings and claimed.

In the drawings:—

Figure 1 is a view in side elevation of a portion of a truck showing the same equipped with the improved tractor apparatus constructed in accordance with the invention.

Figure 2 is a fragmentary top plan view of the forward supporting wheel for the chain and its mounting;

Figure 3 is a fragmentary top plan view of the rear supporting wheel, the supporting arms 5 being in section;

Figure 4 is an enlarged detail view in side elevation of a portion of one of the tractor chains, showing its cooperation with the tread of a drive wheel.

Figure 5 is a cross sectional view on line 5—5 of Figure 4.

Referring to the drawings, 1 designates a portion of the truck body, which may be any suitable design or construction, and 2 denotes the drive axle, and 3 the supporting drive wheels.

Pivotally mounted at 4 on the truck rearward of the drive wheel 3 are hangers 5, having bearings at their lower ends, in which a journal or shaft 6 is mounted. This shaft supports a grooved wheel 7, and also a frame, which comprises the side plates 8. Mounted upon the pins 9 and located between the plates are rollers 10. These rollers bear against the periphery of the drive wheel 3 when the machine is backing and under other circumstances have rolling engagement with the periphery of the wheel 3. These rollers act to take the thrust of the drive wheels 3, incident to the pull of the tractor chain when the truck is in motion. The shaft or journal 6 is mounted in bearings 11 in the lower part of the hangers 5, so as to insure freedom of movement. The plates 8 engage on opposite sides of the wheel 7, and support the thrust rollers 10, which contact with the periphery of the tread of the drive wheels.

Tractor chains are mounted to engage the diametrically opposite parts of the tread of the drive wheels. Each tractor chain is endless, and comprises a plurality of links 12 united in sequence by means of transverse pins 13. Tread blocks 14 of any suitable material, shape or construction are mounted between the links 12. These tread blocks have their tread faces beveled off as shown at 15, and the pins 13 which join the links together pass through the blocks, to hold the blocks in position. In order to hold each block in position relatively to at least one link, where two links unite, an additional pin 16 passes through the opposed links and through the blocks. In this way the tread blocks are prevented from movement relatively to at least one link where two links unite, thereby preventing the links interlocking, during the movements of the tractor chains.

The faces of the blocks 14 are concaved on such radii as to approximately conform to the curvature of the bottom of the groove of the wheel 36. The concavity at the inner end of each block is of a radius less than the radius of the periphery of the drive wheel, so that when the blocks engage the tread of the drive wheels a space will be left, as shown in Figure 5, in which the resilient tire of the drive wheel shall be crowded so that a vacuum or suction is produced, whereby the blocks will adhere to the tread of the drive wheel. These concavities 17 are shown clearly in Figures 4 and 5, and the surfaces of the concavities merge into slight projecting ridges 19, which act to indent the tread of the tire of the drive wheel, due to the load on the wheels, so as to insure a gripping engagement between the blocks and the tread surface. Since the concavities are of so much smaller radii than the radius of the tread of the tire of the drive wheel, and since the surfaces of these concavities merge into the slight ridges 19, the blocks will have a suction engagement with the tread.

Pivoted at 21 on the truck are hangers 22, between the lower ends of which the end 23 of a rod 24 is pivotally connected, the pivot pin 25 of which also passes through the forked end 26 of the auxiliary hanger 27. The forked end 26 of the hanger 27 straddles the end 23. Pivotally mounted at 28 on the truck is a depending screw 29, which passes through an extension 30 of the hanger 27, there being a hand wheel or nut 31 mounted upon the screw, for adjusting the hanger 27. When the hand wheel is moved upwardly on the screw, the hanger 27 is raised, when lowered on the screw the hanger correspondingly lowers. The adjustment of the hanger will adjust the rod 24. The rod 24 passes through a plate 32 through the ends of which rods 33 extend. These rods 33 are threaded as at 34 into the transverse portion of a U-shaped clevis 35. This clevis supports the wheel 36 similar to the wheel 7 having flanges, between which the tractor chain engages. Surrounding the rod 24 and interposed between the plate 32 and a plate 37 is a coiled spring 38, there being a washer 39 and a nut 40 for adjusting the tension of the spring. It will be noted that the rods 33 have heads, which cooperate with the plate 32, and since the spring 38 is interposed between the plates 32 and 37, the U-shaped clevis is yieldably supported. Obviously since the tractor chain passes about the wheel 36, and the clevis 35 is under tension of the spring 38, the tractor chains are yieldably held taut at all times. It will be noted that the lower portion of the tractor chain engages under the drive wheel 3, and the portions beyond this point of engagement diverge upwardly, therefore in this way the tractor chain where it engages the road bed, will more readily accommodate itself to the irregularities, such as the hollows and ridges of the road bed.

It will be noted that the present form of tractor apparatus for trucks and the like is readily demountable, and may be applied to wheels having double tread tires, as well as a single tire with a single tread.

The invention having been set forth, what is claimed as being useful is:—

1. The combination with a vehicle having a drive wheel, of an endless tractor chain engaging the drive wheel at diametrically opposite portions, a spring retracted wheel mounted upon the vehicle forward of the drive wheel and over which the chain passes, a wheel yieldably mounted upon the vehicle rearward of the drive wheel and around which the chain passes, and thrust rollers associated with the last named wheel and bearing against the periphery of the drive wheel.

2. The combination with a vehicle having a drive wheel, of an endless tractor chain engaging the drive wheel at diametrically opposite points, a spring retracted wheel mounted upon the frame of the vehicle forward of the drive wheel and around which the forward portion of the chain passes, hangers pivotally connected to the frame of the vehicle rearward of the drive wheel and oscillatable toward or from the drive wheel, a wheel carried upon said hangers and over which the rear portion of the drive chain passes, and a pair of thrust rollers operatively supported upon the hangers and bearing against the periphery of the drive wheel above and below the axis of the chain wheel.

3. The combination with a motor vehicle having a drive wheel, of an endless tractor chain engaging the tractor wheel and drive wheel at diametrically opposite points, a yoke oscillatably supported from the frame of the vehicle forward of the drive wheel and carrying a wheel around which the chain passes, a spring urging the yoke forward, means for exerting tension upon the spring to draw the yoke forward, hangers pivotally supported upon the frame of the machine rearward of the drive wheel, a chain wheel carried by said hangers and over which the rear end of the tractor chain passes, and members disposed on either side of said last named chain wheel and extending toward the drive wheel and carrying rollers bearing against the periphery of the drive wheel above and below the rotative axis of the chain wheel.

In testimony whereof I hereunto affix my signature.

JOHN THOMAS BELL.